United States Patent Office 3,088,979
Patented May 7, 1963

3,088,979
PRODUCTION OF TRIALKYLBORANES
Albert D. McElroy, Robert G. Brault, and James W. Shepherd, Mars, Pa., assignors to Callery Chemical Company, Pittsburgh, Pa., a corporation of Pennsylvania
No Drawing. Filed May 20, 1959, Ser. No. 814,371
7 Claims. (Cl. 260—606.5)

This invention relates to the production of trialkylboranes and more particularly to a new and improved method for the production of trialkylboranes from diborane and olefins.

The trialkylboranes are compounds of boron corresponding to the general formula $BR_3$, where R is an alkyl group. These compounds which have been at times referred to in the art as trialkyl borons and boron trialkyls, are becoming increasingly important in the chemical field as new uses are discovered. For example, trialkylboranes are of late finding new uses as polymerization catalysts for olefins and acrylic esters.

Heretofore, the trialkylboranes have been generally prepared by Grignard reactions. This method is unsuited to large-scale operation, and is, in fact, difficult to carry out even in the laboratory. The lack of a good method for their production has been a major hindrance to the commercial development of the trialkylboranes; consequently one of the chief objects of this invention is to provide a method for their production which is well adapted to large-scale operation in commerical quantities.

The reaction of diborane with olefins was investigated briefly by Hurd and reported in the Journal of the American Chemical Society, volume 70, pages 2053–2055. His experiments were conducted in sealed tubes, solely in the gas phase and using very low concentrations of diborane. He found that, although some trialkylboranes were formed, the reactions were difficult to control and were complicated by undesirable side effects, such as polymerization of the olefin. Another object of this invention, therefore, is to provide a new and improved method of carrying out the reaction of diborane with olefins, such that trialkylboranes are efficiently produced without danger or difficulty and without complicating side reactions.

Still other objects of this invention will appear from the following specification.

This invention is based upon the discovery that the reaction of diborane and an olefin takes place in an easily controllable and cleancut manner if it is carried out by passing the reactants into a liquid heel. Thus, when an olefin and diborane are reacted in an overall molar ratio of at least 6 to 1 in a pre-formed liquid heel, the trialkylborane is produced rapidly and in high yield, without undesired side reaction. In contrast to the ease and efficiency of the process when carried out in the aforesaid manner, the reaction of diborane and olefins when carried out without a liquid heel has been found to be very unsatisfactory and entirely unsuited to operation on any appreciable scale. Such reactions, when conducted with gaseous olefins and in the gas phase, are difficult to start, but once started are virtually impossible to control; rapid pressure rises, localized heating, and extensive decomposition of the diborane and polymerization of the olefin are commonly encountered. When higher olefins are used, and no liquid heel is employed, the rate of reaction is so slow as to be impractical and no appreciable amounts of the desired product can be realized in any reasonable time.

The liquid heel as that term is used herein means a liquid which comprises a trialkylborane, an alkyldiborane, i.e., a mono-, di-, tri, or tetraalkyldiborane, a mixture of alkyldiboranes, or a mixture of alkyldiboranes and trialkylborane. The heel is usually a pre-formed reaction product of diborane and an olefin. The olefin used to make the heel may be, and preferably is, the same olefin as is to be used in preparing the trialkylborane, since a mixed product is thereby avoided; however, a heel formed from a different olefin can be used if desired or necessary. It should be noted that while the heel is generally prepared from diborane and an olefin, trialkylboranes or alkyldiboranes which can be produced from diborane and an olefin, but which are actually produced in some other manner, can also be used; for example, a trialkylborane produced by a Grignard reaction may be used as the liquid heel. Such pre-formed products are also encompassed by the term liquid heel as it is used throughout this specification.

In order to produce trialkylboranes, the overall molar ratio of olefin to diborane must be at least 6 to 1. In practice, the stoichiometric 6 to 1 ratio or slightly higher is usually employed.

The advantages gained by carrying out the reaction of diborane and olefins according to the method and manner of this invention are not dependent upon the use of any particular temperature or temperatures. However, at room temperature the rate of reaction is relatively slow, so that it is preferred to carry out the reaction at somewhat higher temperatures. In general, temperatures up to the decomposition temperature of diborane can be used although high temperatures are usually not necessary. Certain factors influence the selection of the preferred temperatures of operation in any given case, including the boiling point of the liquid heel at the pressure at which the reaction is being carried out, the nature of the product, as well as the particular olefin employed. In most instances such preferred temperatures fall within the range between about 40° C. and 120° C.

In some cases, however, the trialkylborane produced is a solid at the temperatures of desired operation. For example, tricyclohexylborane, which is produced from cyclohexene and diborane, melts at about 118° C. In such cases, higher temperatures should be used in order to avoid the formation of a solid phase in the heel. If temperatures of such an order are to be avoided, so as to prevent thermal decomposition of the diborane, for instance, then a solvent for the trialkylborane produced may be used in conjunction with the liquid heel. Hydrocarbons are usually satisfactory solvents; in the case of tricyclohexylborane, mentioned above, hexane has been used as a solvent with marked success.

The pressure used is similarly not of critical import, and will depend upon the factors mentioned above as well as the particular mode of operation. However, it may be noted that high pressures contribute to the decomposition of diborane, so that pressures in excess of about 75 to 100 p.s.i.g. are generally avoided, particularly when elevated temperatures, i.e., about about 75° C., are used.

A particular advantage of this method is the equal facility with which it may be adapted to either continuous or batch processing. Thus, in a batch process the liquid heel may be placed in a suitably agitated autoclave or other vessel and pressurized with diborane and the olefin in the proper proportions, whereupon the trialkylborane is produced; similar pressure reactions not carried out in a liquid heel are extremely difficult to operate and often are violent and uncontrollable. In a continuous process, the reactants may be passed into the liquid heel and the liquid product tapped off either intermittently or continuously as it is formed. Still other modes of operation will be apparent to the artisan, thus demonstrating the versatility of this method.

Any olefin or mixture of olefins may be used in the practice of this invention. Some examples of olefins which have been found to be useful are ethylene, propylene, butylene, isobutylene, primary, secondary and iso-pentene, n-hexene, cyclohexene, n-dodecene, propylene trimer (a commercial nine-carbon olefin), propylene tetramer (a commercial twelve-carbon olefin), ADM–51 (a commercial mixture of long-chain olefins averaging about eighteen carbons per molecule), octene, nonene, and octadecene. Polyfunctional olefins, such as 1,4-butadiene, those containing another functional group, such as allyl chloride, and substituted olefins, such as styrene, may also be used.

The following examples will illustrate this invention.

*Example 1.*—The reactor used was an eight gallon, jacketed steel vessel with a turbine agitator and a hot-oil heating jacket. The reactants were fed through dip tubes extending below the agitator and the vent was equipped with a condenser.

The reactor, containing 31.0 lbs. of tributylborane as a liquid heel, was heated to 90° C. Butene, at an average rate of 6.4 lb./hr. and diborane (96% pure by weight) at an average rate of 0.5 lb./hr. based on total feed gas were added for two hours during which time the reactor pressure increased from 12 p.s.i.g. to 16 p.s.i.g. The reactor was maintained at 16 p.s.i.g. by automatically venting the non-condensibles and the temperature was maintained at about 90° C. by external cooling during the reaction. 12.5 lbs. of tributylborane were produced of 100 mole percent purity based on active hydrogen analysis and 93 mole percent purity based on boron analysis. The yield was 98.6% based on the weight of diborane charged.

*Example 2.*—In another run using the same reactor, 8.55 lbs. of butene and 0.7 lb. of diborane were reacted in the presence of a 31.0 lbs. of tributylborane. This product was colorless and was 99.9 mole percent pure based on active hydrogen analysis and 96.3 mole percent pure based on boron analysis. The yield was 91.5% based on the weight of diborane charged.

These and other tests have shown that the process using butene is best carried out at temperatures of between about 80° C. and 90° C.

In some cases, and this is particularly true of the reaction of diborane with ethylene, the process is preferably carried out in a somewhat different manner, i.e., in two stages. In the two stage process, all the diborane is reacted first with part of the olefin, in a liquid heel, and the product thus formed is further treated with sufficient olefin to make the overall olefin to diborane molar ratio at least 6 to 1. This manner of carrying out the process permits more rapid reaction to take place at lower temperatures. For example, the reaction of a 6 to 1 molar ratio of ethylene and diborane in the presence of a triethylborane heel takes place slowly even at 90° C.; the similar process in which four moles of ethylene are reacted with each mole of diborane and the product thus formed is reacted with two additional moles of ethylene is rapid at 40° C.

Illustrative of this embodiment of the invention are the following examples:

*Example 3.*—A 3 inch vertical column reactor was charged with a liquid heel consisting of a reaction product of diborane and ethylene. The column was heated to 35° C. and maintained between 35° C. and 40° C. while passing in diborane and ethylene in a 4.6 to 1 mol ratio; 78.2 mols of diborane and 360.1 mols of ethylene were reacted. 27.0 lbs. of product was removed at the top of the column and charged into a reactor similar to that used in Example 1 above. A total of 7 lbs. of ethylene were then passed in while maintaining the temperature at 40° C., making the overall mol ratio of ethylene to diborane used in this run 6.05 to 1. The triethylborane produced weighed 33.75 lbs. and was 97.3 mol percent pure based on active hydrogen analysis and 98.8 mol percent pure based on boron analysis. The yield obtained was 97.3% based on the weight of ethylene charged.

*Example 4.*—A second run conducted in the same manner produced 33.0 lbs. of triethylborane. The purity was 97.0 mole percent based on active hydrogen analysis and 99.6 mol percent based on boron analysis; the yield was 94.0%.

The two steps of the embodiment described above can also be carried out in a single vessel or a single column. For example, a less than 6 to 1 mol ratio of olefin and diborane can be passed into a liquid heel alternately with additional olefin, and the product removed intermittently. Similarly, a single column, containing the liquid heel, can be used by feeding the diborane and a part of the olefin at the bottom and the rest of the olefin at a point partway up the column; the final product would be removed at the top. Still other variations can of course be used and are within the scope of the invention.

As is apparent from the above examples and description, the trialkylboranes produced in accordance with this invention are extremely pure and are produced in high yields. The reaction is uncomplicated by by-products or side reactions; the products obtained are generally clear and colorless, and no solids are produced in the reaction.

According to the provisions of the patent statutes, we have explained the principle and mode of practicing our invention and have described what we now consider to be its best embodiments. However, we desire to have it understood that within the scope of the appended claims, the invention may be practiced otherwise than as specifically described.

We claim:

1. A method of producing a trialkylborane which comprises reacting an olefin with diborane in a molar ratio of below 6 to 1 and in a pre-formed liquid heel consisting essentially of at least one compound selected from the group consisting of alkyl diboranes and trialkylboranes, and then reacting the product thus produced with sufficient additional olefin so as to make the overall molar ratio at least 6 to 1.

2. A method in accordance with claim 1 in which the liquid heel consists essentially of a trialkylborane.

3. A method in accordance with claim 1 in which the liquid heel consists essentially of alkyldiboranes.

4. A method in accordance with claim 1 in which the olefin is ethylene, and the trialkylborane is triethylborane and the liquid heel consists essentially of triethylborane.

5. A method of producing a trialkyl borane which comprises reacting a material selected from the group consisting of an alkyldiborane and mixtures of alkyldiboranes with a stoichiometric excess of an olefin.

6. A method in accordance with claim 5 in which each of said alkyl groups is ethyl and the olefin is ethylene.

7. A method of producing triethyl borane which comprises reacting a stoichiometric excess of ethylene with an ethyl diborane.

References Cited in the file of this patent

Hurd: J. Am. Chem. Soc., Vol. 70, pages 2053–5 (1948).

Stone: J. Chem. Soc. (London), pages 2755–9 (1950).

Whatley et al.: J. Am. Chem. Soc., Vol. 76, pages 835–8 (1954).

Brown et al.: Journ. of Organic Chem., Vol. 22, pages 1136–7 (1957).

Graham et al.: Chem. Abs., Vol. 52, page 3674 (1958).

Chem. and Eng. News, Vol. 37, pages 36–7 (1959).